United States Patent [19]

Ting-Chih et al.

[11] Patent Number: 5,067,517
[45] Date of Patent: Nov. 26, 1991

[54] QUANTITATIVE LIQUID LEVEL CONTROLLING DEVICE

[76] Inventors: Liu Ting-Chih; Hsieh Sheng-Shun; Huang Shih-Shiung, all of 9-2 Fl., No. 500, Lin Sen N. Road, Taipei, Taiwan

[21] Appl. No.: 605,661

[22] Filed: Oct. 29, 1990

[51] Int. Cl.⁵ .................... F16K 31/24; F16K 33/00
[52] U.S. Cl. .................... 137/426; 137/429; 137/449; 137/801; 137/901
[58] Field of Search .......... 137/390, 426, 430, 433, 137/434, 442, 443, 444, 449, 801, 901; 251/294

[56] References Cited

U.S. PATENT DOCUMENTS

| | | | |
|---|---|---|---|
| 231,967 | 9/1880 | Milne et al. | 137/449 |
| 236,311 | 1/1881 | Doherty | 137/444 |
| 602,512 | 4/1898 | Lecher et al. | 137/449 |
| 688,166 | 12/1901 | Gaylord | 137/444 |
| 877,063 | 1/1908 | Edes et al. | 137/446 |
| 1,214,212 | 1/1917 | Newton | 137/429 |
| 1,478,989 | 12/1923 | Nash | 137/446 |
| 1,506,973 | 9/1924 | Conrader | 137/426 |
| 1,619,431 | 3/1927 | Mendizabal | 137/426 |
| 1,968,517 | 7/1934 | Dixon | 137/426 |
| 2,975,798 | 3/1961 | Jones | 137/449 |
| 3,305,212 | 2/1967 | Beach | 137/801 |
| 3,465,784 | 9/1969 | Cofoid | 137/430 |
| 4,456,222 | 6/1984 | Shen | 137/801 |
| 4,667,349 | 5/1987 | Son | 137/801 |

*Primary Examiner*—George L. Walton
*Attorney, Agent, or Firm*—Bacon & Thomas

[57] ABSTRACT

A quantitative liquid level controlling device, comprising a housing having a socket at the top for attaching to a water supply pipe, and a control rod with a gravity pendant suspending therefrom through a cord for adjusting the desired water level. The gravity pendant pulls down the control rod to stop a connecting rod in position permitting a driving rod to constantly move a ball away from the water outlet hole inside the housing. The gravity pendant is floated when the desired water level is reached, permitting the control rod and the driving rod to move back so that the ball is returned to block up the water outlet hole.

6 Claims, 6 Drawing Sheets

QUANTITATIVE LIQUID LEVEL CONTROLLING DEVICE

BACKGROUND OF THE INVENTION

The present invention relates to liquid level controlling devices, and more particularly to a quantitative liquid level controlling device which can be conveniently adjusted for controlling water level according to any desired range.

Currently, there are various kinds of liquid level controllers used for controlling water level in water reservoir or oil level in oil tank. These conventional liquid level controllers are not satisfactory in use because they are generally of fixed type for controlling a fixed liquid level once they are well installed. When different level is required in a water reservoir, separate water level controlling devices must be used. For example, the amount of water (water level) in a bathtub must be adjusted to respectively accommodate the adult or the child. Conventional liquid level controllers can not be used for this purpose. The present invention has been accomplished to eliminate this problem.

SUMMARY OF THE INVENTION

The present invention is to provide a quantitative liquid level controlling device for controlling water level as desired. The device comprises a housing having a socket at the top for attaching to a water supply pipe, and a holder plate transversely fastened therein at one side. A control rod is longitudinally secured to the holder plate with a gravity pendant suspending therefrom through a cord for adjusting the desired water level. The gravity pendant pulls down the control rod to stop a connecting rod in position permitting a driving rod to constantly move a ball away from the water outlet hole inside the housing. The gravity pendant is floated when the desired water level is reached, permitting the control rod and the driving rod to move back so that the ball is returned to block up the water outlet hole.

BRIEF DESCRIPTION OF THE DRAWINGS

The present invention will now be described by way of example only, with reference to the annexed drawings, in which.

DETAILED DESCRIPTION OF THE PREFERRED EMBODIMENT

Figure 1:
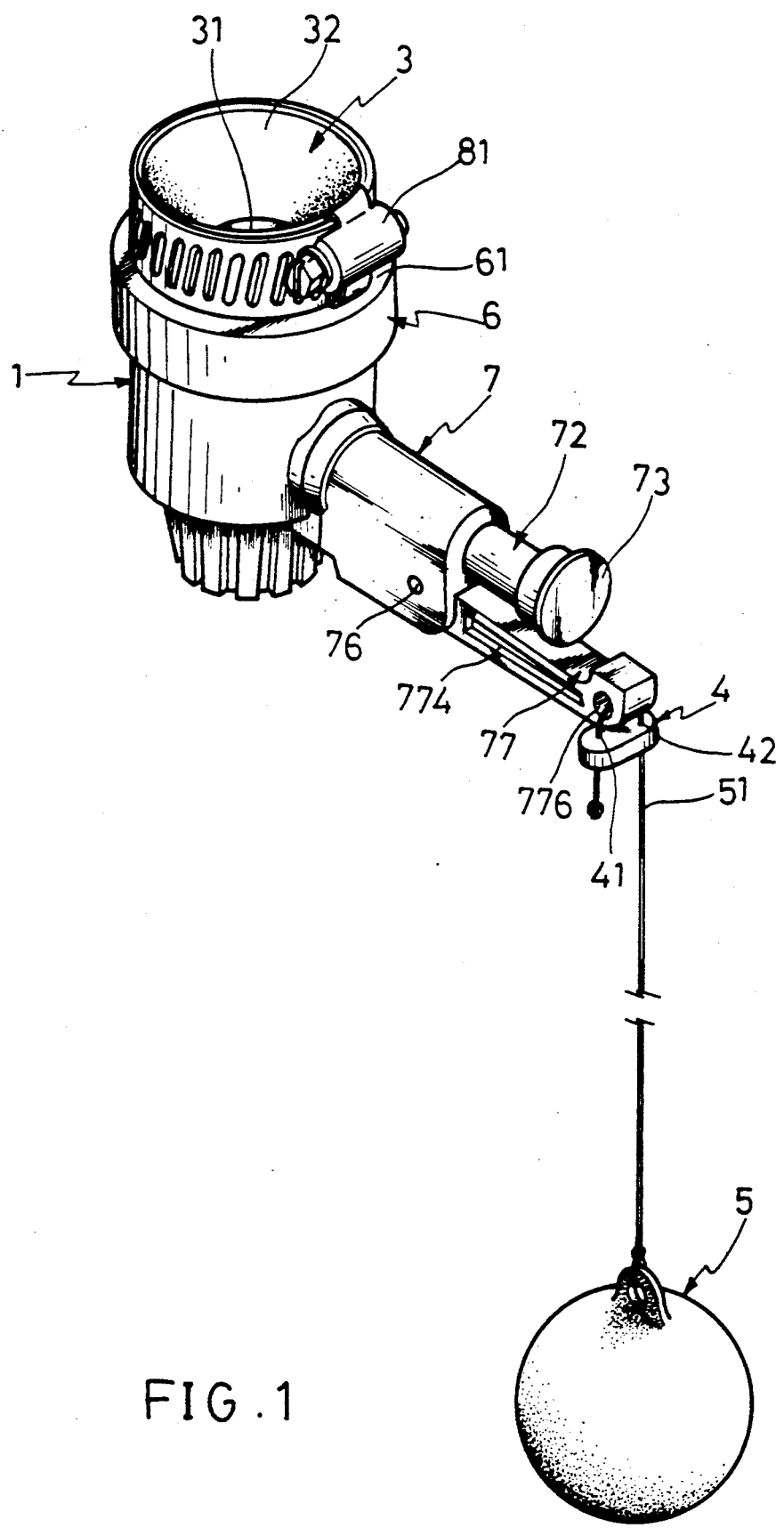
FIG. 1 illustrates a quantitative liquid level controlling device embodying the present invention.
Figure 2:
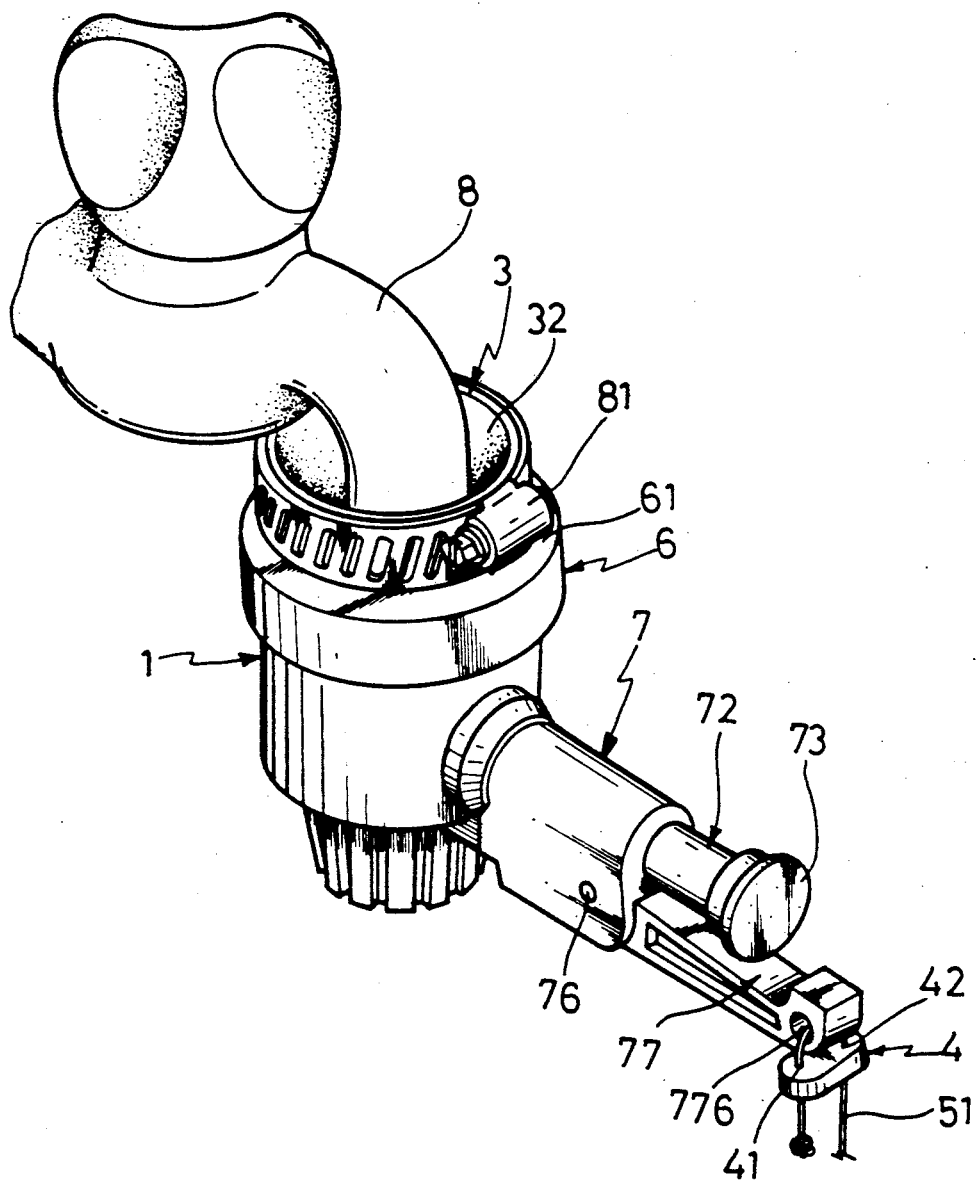
FIG. 2 is a perspective view of the present invention, which is attached to a water tap.
Figure 3:
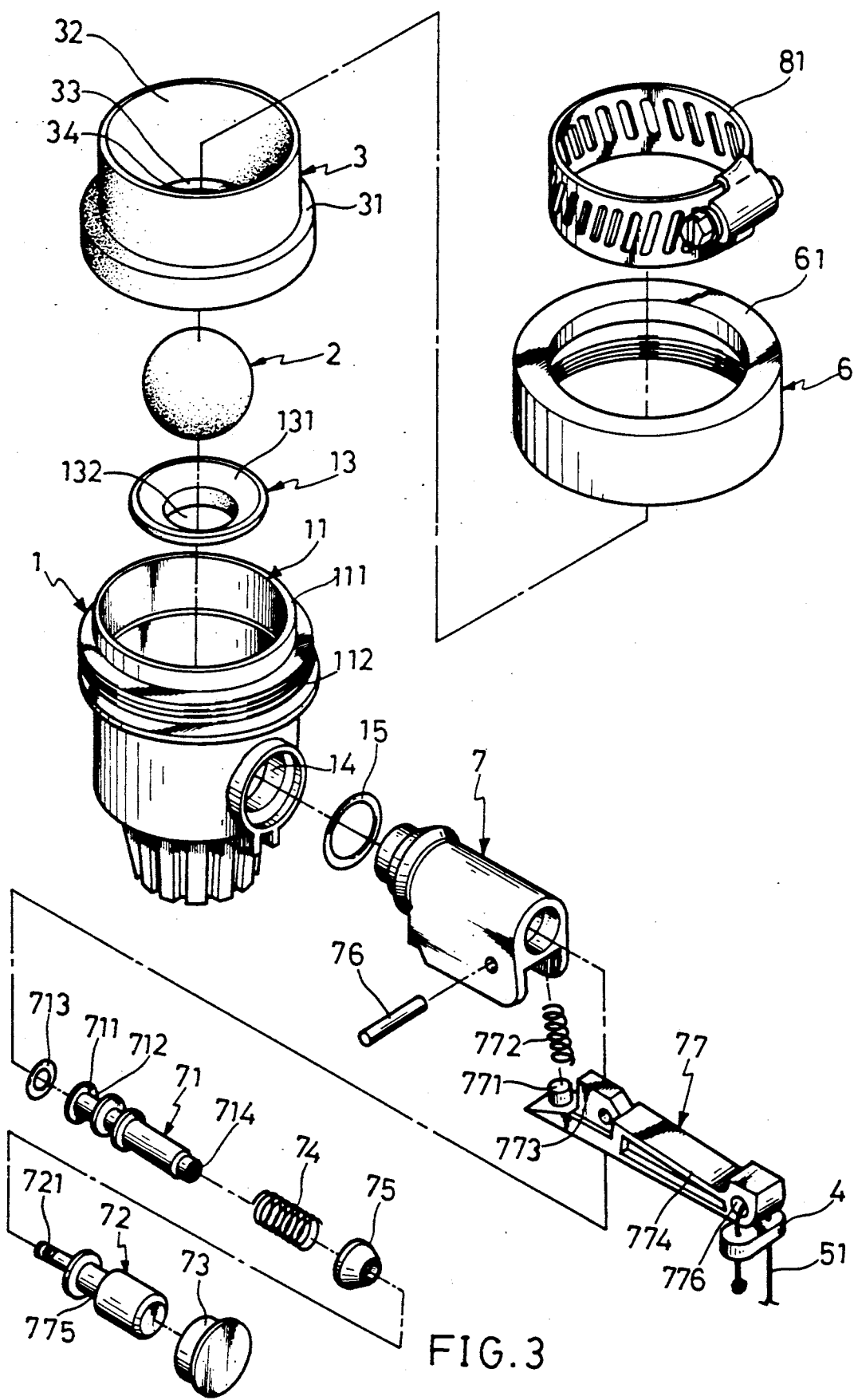
FIG. 3 is a perspective dismantled view of the present invention.
Figure 4:
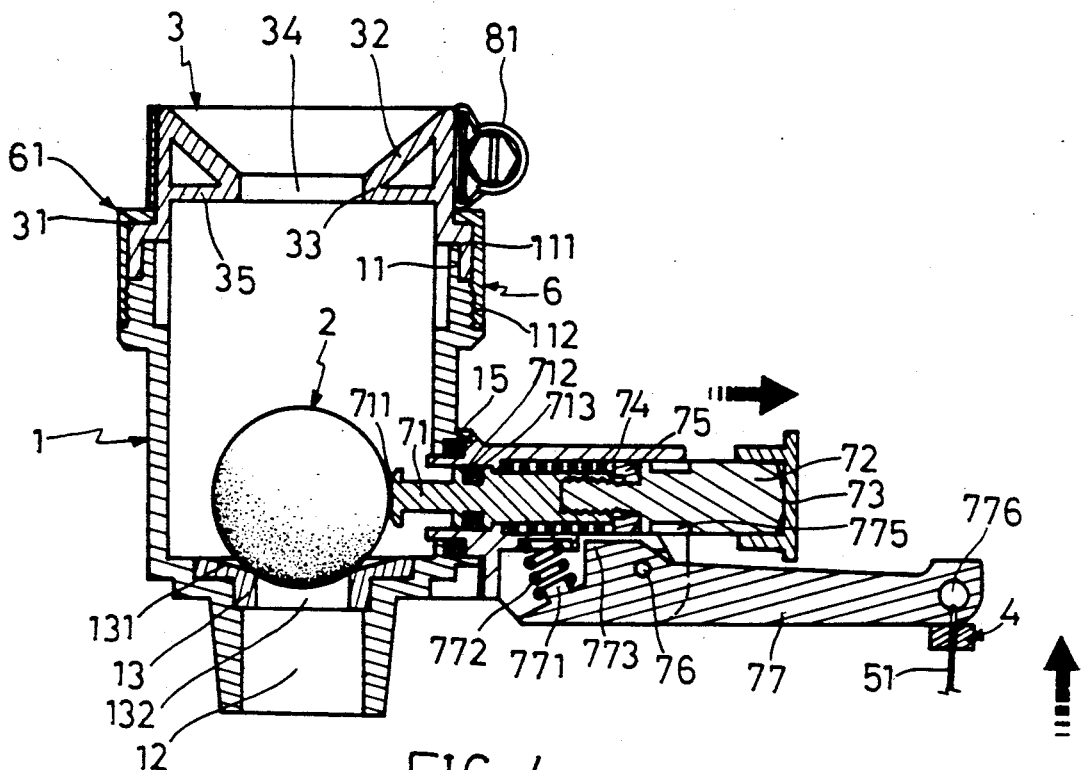
FIG. 4 is a longitudinal sectional view of the present invention, in which the water outlet hole is sealed by the ball.
Figure 5:
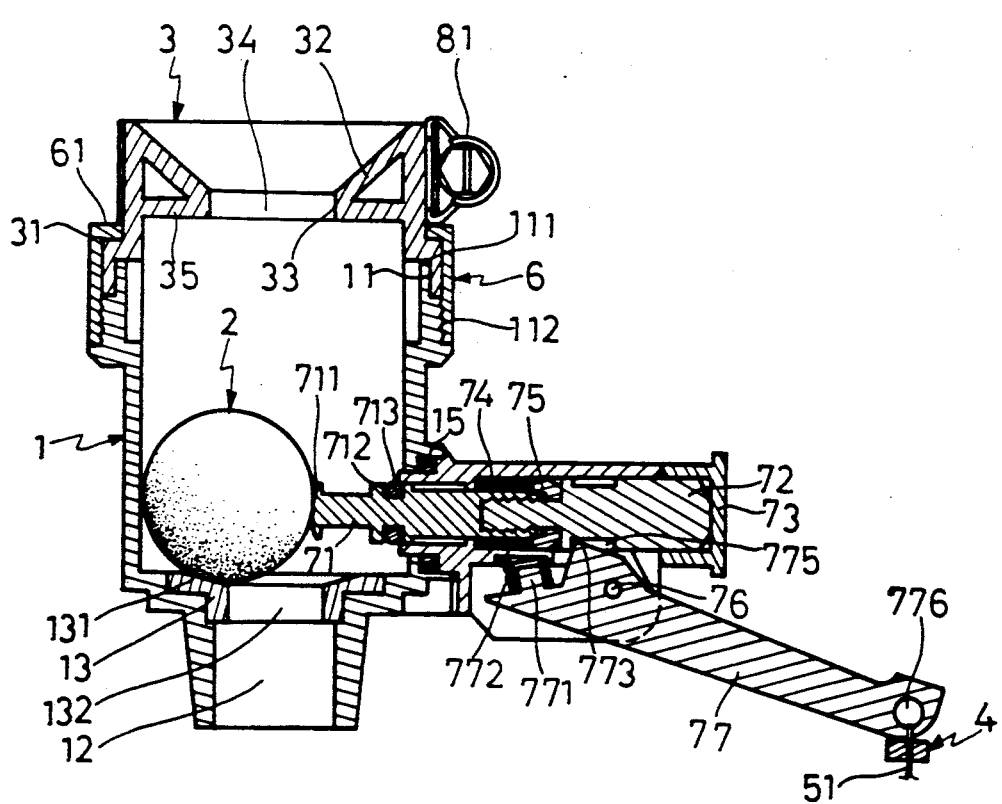
FIG. 5 is another longitudinal sectional view of the present invention, in which the ball is moved away from the hole of the annular gasket permitting water to flow through the water outlet hole.

Referring to FIGS. 1 through 3, there is illustrated a quantitative liquid level controlling device embodying the present invention and generally comprised of a housing 1, a socket 3, a ball 2, a locating element 4, a gravity pendant 5, a ring connector 6 and a holder plate 7. The housing 1 is substantially a hollow cylinder having a circular groove 111 on its top edge 11 for mounting the bottom flange 31 of the socket 3, and an outer thread 112 below the circular groove 111 for mounting the ring connector 6 through screw joint. The ring connector 6 has an inner thread and a ring-shaped topmost edge 61 transversely projecting inward. After the socket 3 is mounted on the groove 111 of the housing 1, the ring connector 6 is screwed up with the outer thread 112 of the housing 1 with its ring-shaped topmost edge 61 stopped at the top of the bottom flange 31 of the socket 3 to firmly secure the socket 3 to the housing 1. The socket 3 has a concave surface portion 32 internally at the top with a center hole 34 vertically piercing therethrough for inserting a water tap 8, at least a reinforcing rib 35 to reinforce its structure for mounting a water tap 8, and a retaining edge 33 at the bottom of the concave surface portion 32 for retaining the water tap 8 inserted therein. There is an adapter 81 attached to the water tap 8 permitting flow of water to smoothly flow into the housing 1. The housing 1 further comprises a water outlet hole 12 fastened with an annular gasket 13. The annular gasket 13 has a concave top surface 131 with a hole 132 made thereon at the center. The ball 5 is placed inside the housing 1 and stopped at the hole 132 of the annular gasket 13 to close up with water outlet hole 12. There is a through-hole 14 transversely made on the outer wall of the housing 1 at a lower position with a rubber ring 15 fastened therein for mounting the holder plate 7 through screw or adhesive joint. The holder plate 7 has a hollow body with a driving rod 71 transversely fastened therein. The driving rod 71 has an arch-shaped top flange 711 at one end, a circular groove 712 near the top flange 711 with a rubber ring 713 fastened thereon for protection against water leakage, a bolted hole 714 at an opposite end for fastening a connecting rod 72. The connecting rod 72 has an unitary screw rod 721 made at one end in relatively smaller outer diameter so that a compression spring 74 and a movable cap 75 can be sleeved on the driving rod 71 and squeezed by the connecting rod 72 once the unitary screw rod 721 of the connecting rod 72 is fastened in the bolt hole 714 of the driving rod 71. After mounting, the compression spring 74 is squeezed between the movable cap 75 and an inner flange 78 inside the holder plate 7. Therefore, the compression spring 74 provides a push force to constantly force the driving rod 71 to move outward relative to the housing 1. There is a knob 73 fastened on the other end of the connecting rod 72 through which the connecting rod 72 can be conveniently pressed to squeeze the compression spring 74. There is also provided a control rod 77 secured to the holder plate 7 by a locking pin 76 and disposed longitudinally in alignment with the holder plate 7. The control rod 77 has a vertical projection 771 on the top and at one end for retaining a spring 772, a raised portion 773 at the top at a suitable location, and an elongated arm of force 774 which has a through-hole 776 at its rear end for mounting a cord 51 to hold the gravity pendant 5 through the locating element 4.

Figure 6:
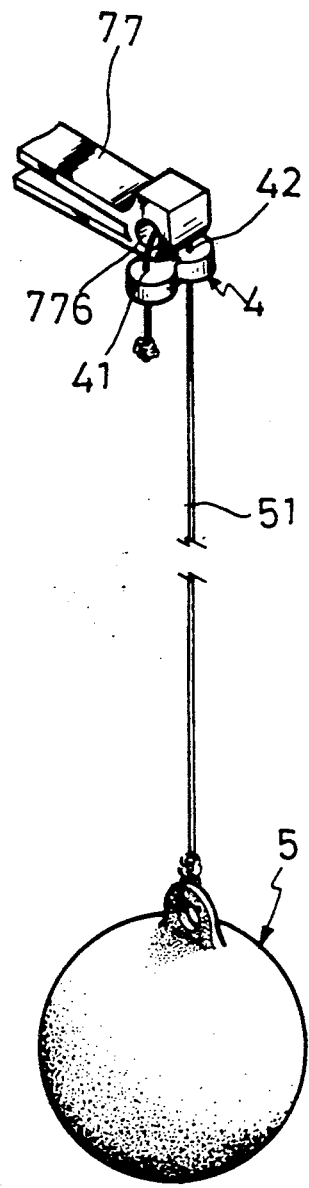
FIG. 6 is a perspective view of the locating element and the gravity pendant according to the present invention.
Figure 7:
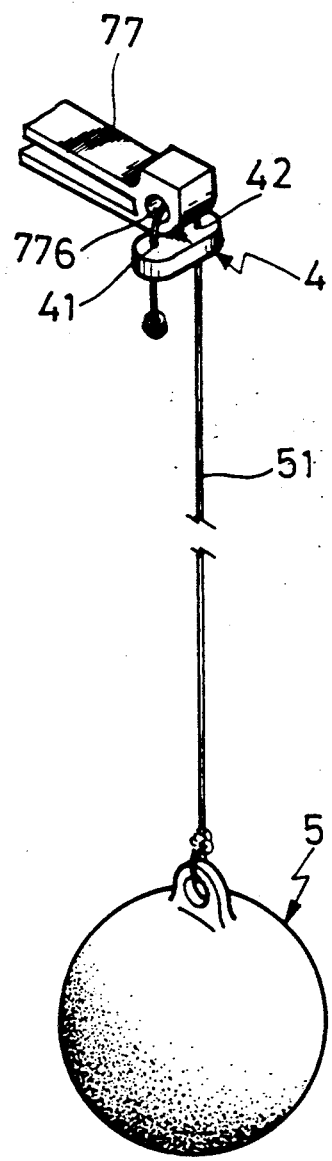
FIG. 7 is a perspective view of an alternate form of the locating element and the gravity pendant according to the present invention.

Referring to FIG. 6, the locating element 4 is made of flexible plastic or rubber material, having two holes 41 and 42 spaced from each other for inserting a cord 51. The inner diameter of the holes 41 and 42 is slightly smaller than the outer diameter of the cord 51 so that the cord 51 can be firmly retained therein. After insertion of the cord 51 through the holes 41 and 42, a knot is made in the cord 51 at one end, and the gravity pendant 5 is secured to the cord 51 at the opposite end. By means of pulling the cord 51, the level position of the gravity pendant 5 can be properly adjusted.

The operation of the present invention is quite simple and outlined hereinafter. After the present invention is attached to the outlet pipe of a water tap 8, the gravity pendant 5 is disposed in a water reservoir or the like where water level is to be controlled. If the gravity pendant 5 is disposed in a position free from buoyance, the control rod 77 is pulled down by the gravity of the gravity pendant 5 permitting its raised portion 773 to press on the movable cap 75 and further, to engage in the groove 775, which is made on the connecting rod 72, so as to force the arch-shaped top flange 711 of the driving rod 71 to move the ball 2 away from the hole 132 of the annular gasket 13. Thus, water from the water tap 8 is permitted to discharge through the water outlet hole 12 of the housing 1. As soon as water level is increased to lift the gravity pendant 5, the spring force of the spring 772 permits the arm of force 774 of the control rod 77 to be lifted. Once the arm of force 774 of the control rod 77 is lifted, the raised portion 773 is simultaneously forced to disengage from the groove 775, and the driving rod 71 as well as the connecting rod 72 are simultaneously forced by the compression spring 74 to move back to original position. As soon as the driving rod 71 is moved back, the ball 2 is immediately forced by its gravity and water pressure to seal the hole 132 of the annular gasket 13, and therefore, water flow is stopped from flowing out of the water outlet hole 12 of the housing 1, i.e. water supply is stopped.

Because the socket 3 is provided for holding a water tap, the center hole 34 of the socket 3 can be designed in round, square or any other suitable shape suiting with the water outlet pipe of a water tap to mount.

What is claimed:

1. A quantitative liquid level controlling device, comprising:
  a housing having a circular groove at the top, an outer thread on its outer wall, an outlet hole at the inside with an annular gasket fastened therein, and a through-hole transversely piercing through its outer wall at one side at a lower position with a rubber ring fastened therein;
  a ball placed inside said housing and releasably stopped at said annular gasket to close said outlet hole;
  a socket having a bottom flange mounted on the circular groove at the top of said housing, a concave surface portion disposed internally at the top with a center hole vertically piercing therethrough, a vertical retaining edge at the bottom of said concave surface portion for retaining a tap or pipe connector inserted therein, and at least a unitary reinforcing rib at a suitable location to reinforce its structure for holding said tap or pipe connector;
  a ring connector having an inner thread screwed up with the outer thread of said housing with its ring-shaped topmost edge stopped at the top of the bottom flange of said socket to firmly secure said socket to said housing;
  a holder plate fastened in the transverse through-hole of said housing and fixedly secured thereto having a driving rod transversely fastened therein, said driving rod having sleeved thereon a compression spring and a movable cap and longitudinally screwed up with a connecting rod at one end, and a control rod secured thereto by a locking pin disposed longitudinally in alignment therewith, said control rod having a raised portion at the top and a through-hole at the opposite end;
  a locating element made of flexible resilient material, having two holes spaced from each other for fastening a cord through the through-hole of said control rod to secure said locating element to said control rod;
  a gravity pendant secured to said cord at one end to pull said control rod downward by means of its gravity; and
  wherein said gravity pendant pulls said control rod to move downward permitting the raised portion of said control rod to engage in the groove on said connecting rod so that said driving rod moves transversely through said through-hole into said housing at said outlet and pushes said ball away from said annular gasket permitting liquid from said tap to discharge through said outlet hole; said gravity pendant will float on the quantitative fluid, when the quantitative fluid level reaches a predetermined liquid level that is determined by the selectively positioning of said gravity pendant, thereby permitting said control rod to disengage from the groove allowing said driving rod to move back to its original position solely by said compression spring so that said ball is returned to close the hole on said annular gasket and to completely stop the flow of liquid.

2. The quantitative liquid level controlling device of claim 1, wherein said annular gasket has a concave top surface with a hole made thereon at the center so that said ball can be smoothly moved, by means of the effect of its gravity and water pressure, to stop at the hole on said annular gasket.

3. The quantitative liquid level controlling device of claim 1, wherein said control rod further comprises a vertical projection fastened with a spring and stopped against the bottom of said holder plate permitting an arm of force to be pulled by said gravity pendant to move its raised portion to engage in the groove of said connecting rod, and permitting the spring on its vertical projection to force its arm of force to move back to its original position once said gravity pendant is lifted by buoyance so as to disengage its raised portion from the groove of said connecting rod and permit said driving rod to move back and said ball to close the hole on said annular gasket again.

4. The quantitative liquid level controlling device of claim 1, wherein said cord is adjustably fastened in said locating element to adjust the level position of said gravity pendant so as to regulate the desired liquid level.

5. The quantitative liquid level controlling device of claim 1, wherein said socket is replaceable.

6. The quantitative liquid level controlling device of claim 1, which further comprises an adapter for firmly securing said socket to a tap.

* * * * *